(12) United States Patent
Beals et al.

(10) Patent No.: US 10,043,043 B1
(45) Date of Patent: Aug. 7, 2018

(54) INTEGRATED CIRCUIT CARD READER WITH IMPROVED HEAT DISSIPATION

(71) Applicant: Dish Technologies L.L.C., Englewood, CO (US)

(72) Inventors: William Michael Beals, Englewood, CO (US); Jerome A. LaPalme, Aurora, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 15/426,894

(22) Filed: Feb. 7, 2017

(51) Int. Cl.
  *G06K 7/00* (2006.01)
  *G06K 19/077* (2006.01)
(52) U.S. Cl.
  CPC ....... *G06K 7/0013* (2013.01); *G06K 19/0772* (2013.01)
(58) Field of Classification Search
  CPC .. G06K 7/0013; G06K 19/0772; G06K 7/003; G06K 7/0056
  USPC ........................................................ 235/441
  See application file for complete search history.

(56) References Cited

U.S. PATENT DOCUMENTS

| | | | | |
|---|---|---|---|---|
| 6,655,590 | B1* | 12/2003 | McFeely | G06K 7/0021 235/441 |
| 6,721,182 | B1 | 4/2004 | Wells et al. | |
| 8,167,643 | B2 | 5/2012 | Yoshida et al. | |
| 8,172,619 | B2 | 5/2012 | Williams | |
| 8,747,163 | B2 | 6/2014 | Little et al. | |
| 9,076,050 | B2 | 7/2015 | LaPalme et al. | |
| 9,760,742 | B2 | 9/2017 | Beals et al. | |
| 2002/0050516 | A1 | 5/2002 | Kitchen | |
| 2003/0022537 | A1* | 1/2003 | Bricaud | G06K 7/0021 439/152 |
| 2008/0121706 | A1* | 5/2008 | Defibaugh | G06K 7/0021 235/441 |
| 2010/0073881 | A1* | 3/2010 | Williams | G06K 7/0021 361/704 |
| 2010/0144179 | A1 | 6/2010 | Guo et al. | |
| 2011/0069456 | A1 | 3/2011 | Brandon et al. | |
| 2011/0130029 | A1 | 6/2011 | Yoshida et al. | |
| 2011/0300759 | A1 | 12/2011 | Ngo | |
| 2012/0243176 | A1 | 9/2012 | Ritter et al. | |
| 2013/0347051 | A1 | 12/2013 | Bose et al. | |

(Continued)

FOREIGN PATENT DOCUMENTS

| | | |
|---|---|---|
| DE | 20 2007 006 626 U1 | 11/2007 |
| EP | 0 520 080 A1 | 12/1992 |

(Continued)

OTHER PUBLICATIONS

International Search Report, dated May 9, 2016, for International Application No. PCT/US2016/018637, 4 pages.

*Primary Examiner* — Toan Ly
(74) *Attorney, Agent, or Firm* — Seed IP Law Group LLP

(57) ABSTRACT

Various embodiments provide a card reader that provides heat dissipation for high data transfer ICCs. The card reader includes a body having a press bar that physically contacts an upper surface of the ICC when fully inserted into the card reader. The press bar includes an aperture directly overlying and aligned with the card contacts of the card reader and the contact pads of the ICC when fully inserted. The aperture allows any heat generated by the ICC to radiate to a surrounding cooling medium, such as air.

16 Claims, 6 Drawing Sheets

(56) References Cited

U.S. PATENT DOCUMENTS

| | | | |
|---|---|---|---|
| 2014/0162490 A1* | 6/2014 | Hodge | G06K 7/00 439/487 |
| 2014/0198456 A1 | 7/2014 | Bose et al. | |
| 2016/0379016 A1* | 12/2016 | Beals | G06K 7/0056 235/441 |
| 2017/0337401 A1 | 11/2017 | Beals et al. | |

FOREIGN PATENT DOCUMENTS

| | | |
|---|---|---|
| GB | 2 436 170 A | 9/2007 |
| WO | 2012/118545 A1 | 9/2012 |

\* cited by examiner

INTEGRATED CIRCUIT CARD READER WITH IMPROVED HEAT DISSIPATION

BACKGROUND

Technical Field

The present disclosure is directed to a card reader device having improved heat dissipation.

Description of the Related Art

Integrated circuit cards (ICC), such as smart cards and subscriber identification module (SIM) cards, are used in a variety of electronic devices. Generally, an ICC houses an embedded integrated circuit that provides a range of functions, such as identification and data storage.

Signals generated by the integrated circuit are brought to a surface of the ICC by electrically coupling the integrated circuit to a number of contact pads on the surface of the ICC. The contact pads are used to provide electrical connectivity between the integrated circuit within the ICC and a host in which a card reader resides. A number of card contacts (i.e., terminals) are typically employed in the card reader to serve as an interface between the host and the ICC. When an ICC is fully inserted into the card reader, the card contacts contact the contact pads of the ICC, and, as a result, electrically couple the internal circuitry of the host to the integrated circuit of the smart card.

Conventional ICCs typically conform to ISO/IEC standards. ISO 7810 standardizes the outer dimension of an ICC, often referred to as the card envelope, and ISO 7816 standardizes the location and signal connectivity of the card's contact pads. For example, for a smart card, ISO 7816 defines a one square centimeter contact area comprising eight contact pads. Six of the contact pads are defined as VCC, GND, Reset, Clock, Vpp, Serial Data I/O, and two of the contact pads are Reserved for Future Use (RFU1 and RFU2).

Conventional ICCs are low powered and do not generate significant heat. Thus, heat dissipation for conventional ICCs is unnecessary. However, new high data transfer or high-bandwidth ICCs with increased functionality are currently being developed. These new high-bandwidth ICCs use more power than conventional ICCs and, consequently, generate additional internal heat such that thermal management is desirable to prevent overheating and possible damage to the ICC.

BRIEF SUMMARY

Current card readers do not provide adequate heat dissipation for high data transfer ICCs. Conventional card readers typically include a cover that contacts and presses against an upper surface of the ICC. The cover is usually a solid piece of plastic to maximize the strength of the cover. This solid piece of plastic creates a significant extra layer of insulation between the ICC and ambient conditions, such as air. Consequently, conventional card readers generally retain heat and are less efficient at radiating heat from the ICC.

The present disclosure is directed to a card reader that provides heat dissipation for high data transfer ICCs. The card reader includes a body having a press bar that makes physical contact with an upper surface of the ICC. The press bar ensures that a proper electrical connection is made between contact pads on a lower surface of the ICC and card contacts of the card reader. The press bar includes an aperture or opening directly overlying and aligned with the contacts pads of the ICC and the card contacts of the card reader. The aperture is a venting area that allows any heat generated by the integrated circuit housed in the ICC to radiate through the aperture to a surrounding cooling medium, such as air. Accordingly, overheating and possible damage to the ICC may be avoided.

According to one embodiment, the card reader is included in a set-top box. The card reader includes a body, card contacts, engagement members, lower retention clips, side retention clips, and a press bar.

The body is a single, contiguous piece. The body includes a lower portion, an upper portion, and side portions. The side portions couple the lower portion and the upper portion to each other, and spaces the lower portion from the upper portion. The lower portion, the upper portion, and the side portions form a slot that is configured to receive the ICC.

The card contacts create electrical connections between an integrated circuit within the ICC and the set-top box in which a card reader resides. Each of the card contacts includes a card contact portion, a mounting portion, and a circuit board contact portion. The card contact portion is configured to physically contact a respective contact pad on a lower surface of the ICC when fully inserted into the card reader. The mounting portion is secured to the lower portion of the body. The circuit board contact portion is configured to physically contact a pad of a circuit board in the set-top box.

The engagement members are coupled to the side portions and extend from the lower portion of the body. The engagement members mount the card reader to a circuit board in the set-top box.

The lower retention clips and side retention clips keep the ICC in a fixed position when fully inserted into the card reader. The lower retention clips apply an upward physical force on the lower surface of the ICC when fully inserted into the card reader. The side retention clips apply a lateral physical force on the sides of the ICC when fully inserted into the card reader.

The press bar prevents the ICC from flexing away from the card contacts and ensures that reliable electrical connection is made between the contact pads and the card contacts when the ICC is fully inserted into the card reader. The press bar directly overlies the card contacts and physically contacts an upper surface the ICC. The press bar includes an aperture to allow heat generated by the ICC, in particular the integrated circuit housed in the ICC, to dissipate through the aperture to a surrounding cooling medium, such as air. The aperture has length and width that are approximately equal to or greater than the length and width, respectively, of the contact pads of the ICC. Further, the footprint of the aperture has an area approximately equal to or larger than the area of the footprint of the contact pads. The aperture directly overlies the card contacts on the opposite side of the card from the card contacts. When the ICC is fully inserted into the card reader, the aperture exposes an area of the upper surface of the ICC that is directly opposite to the contact pads on the lower surface of the ICC. The area of the upper surface of the ICC that is exposed by the aperture is approximately equal to or larger than the area of the footprint of the contact pads.

The press bar further includes reinforcement ribs and a reinforcement ring. The reinforcement ribs provide additional strength for the entire press bar to minimize flexing of the ICC away from the card contacts when fully inserted into the card reader. The reinforcement ring provides additional strength around the aperture to further ensure a reliable electrical connection between the contact pads and the card contacts. The reinforcement ring completely encircles the aperture.

The card reader further includes openings in addition to the aperture to provide additional paths for heat generated by the ICC to dissipate to a surrounding cooling medium.

DETAILED DESCRIPTION

Figure 1:
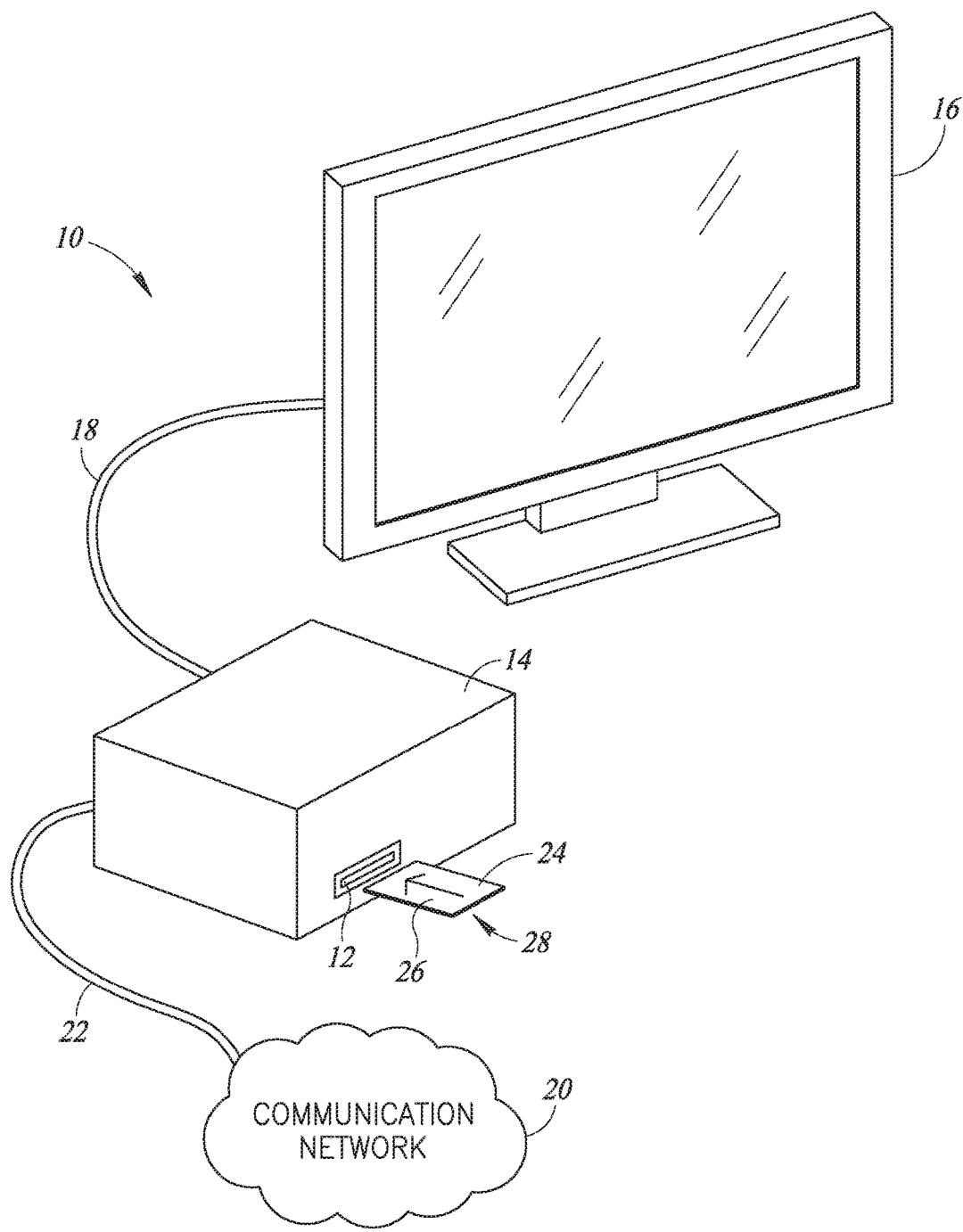
FIG. 1 shows a system that includes a card reader, according to one embodiment disclosed herein.

In the following description, certain specific details are set forth in order to provide a thorough understanding of various embodiments of the disclosure. However, one skilled in the art will understand that the disclosure may be practiced without these specific details. In some instances, well-known details associated with integrated circuits, integrated circuit cards, card readers, and set-top boxes have not been described to avoid obscuring the descriptions of the embodiments of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

Conventional ICCs typically perform non data-intensive functions, such as data storage and key generation, and have data transfer rates of approximately 100 kilobits per second. As a result, conventional ICCs are low powered and do not generate significant heat. Thus, heat dissipation for conventional ICCs is unnecessary.

It is contemplated that a high data transfer ICC with data intensive functions, such as data encryption and decryption, will soon be used in electronic devices, such as set-top boxes. These high data transfer ICCs may transfer data up to 400 megabits per second, which is approximately 4000 times larger than data transfers for conventional ICCs. Such high data transfer smart cards will require more than the conventional eight contact pads. In particular, a high data transfer ICC may have twelve defined contact pads (e.g., CLK, RST, VCC, SC IN−, SC IN+, I/O, VPP, VSS, CLK−, CLK+, SC OUT−, SC OUT+) on one surface of the ICC. Eight of the contact pads may be in the same location as the eight contact pads on a conventional smart card set forth by the ISO 7816 standard, two new contact pads may be added to each of the four-contact-pad rows, and two new contact pads may be added in a row between the four-contact-pad rows. The ISO RFU1 and ISO RFU2 contact pads that are part of a conventional smart card may be omitted if not used. With the additional functions and contact pads, the integrated circuit on board a high data transfer ICCs generates significant internal heat.

FIG. 1 is a system 10 that includes a card reader 12 according to principles disclosed herein. The system 10 includes a set-top box 14 coupled to a display device 16 over a first cable 18 and to a communication network 20 over a second cable 22. The card reader 12 is configured to receive and read an ICC 24. In one embodiment, the ICC 24 is a high data transfer ICC. The ICC 24 has a first side 26 and an opposite second side 28. The second side 28 includes contact pads that are electrically coupled to an embedded integrated circuit 32 housed within the ICC 24.

The set-top box 14 is configured to receive program content transmitted from a content service provider over the communication network 20 and output the program content to the display device 16. The display device 16 may be any type of display, such as a television, tablet, or computer. The program content may be in the form of video, audio, data, multimedia, or another form appropriate for transmission over the communication network 20.

The communication network 20 facilitates the transmission of program content from the content service provider to the set-top box 14. The communication network 20 may include any type of wired or wireless communication system, such as satellite, antenna, cable, and servers, in their associated network topologies. In one embodiment, the content service provider is a direct broadcast satellite service provider transmitting content over a satellite communication network that includes antennas and satellites.

Figure 2:
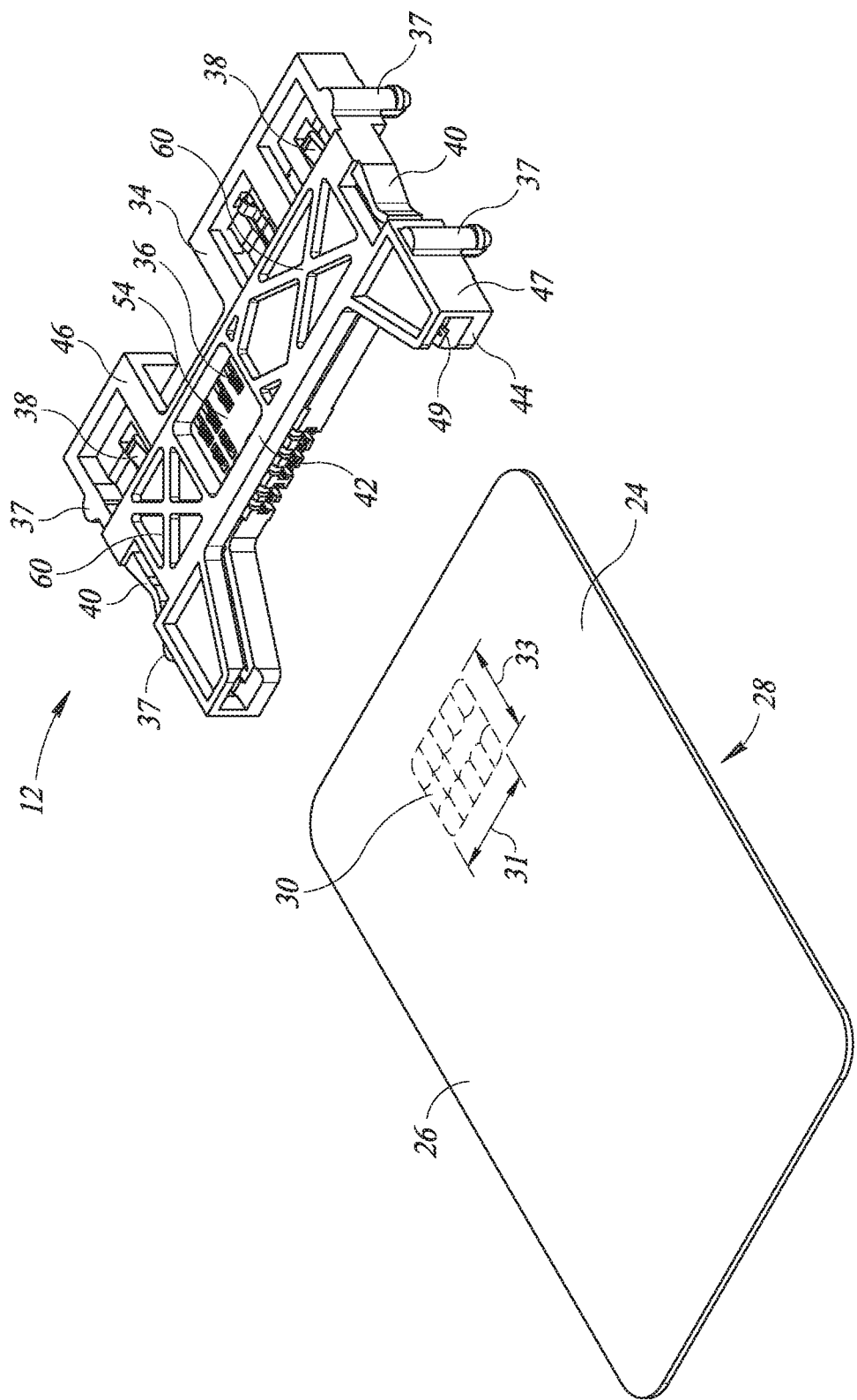
FIG. 2 shows an isometric view of an integrated circuit card and a card reader, according to one embodiment disclosed herein.

FIG. 2 is an isometric view of the ICC 24 and the card reader 12 according to one embodiment. As previously discussed, the card reader 12 is configured to receive and read the ICC 24.

Figure 3:
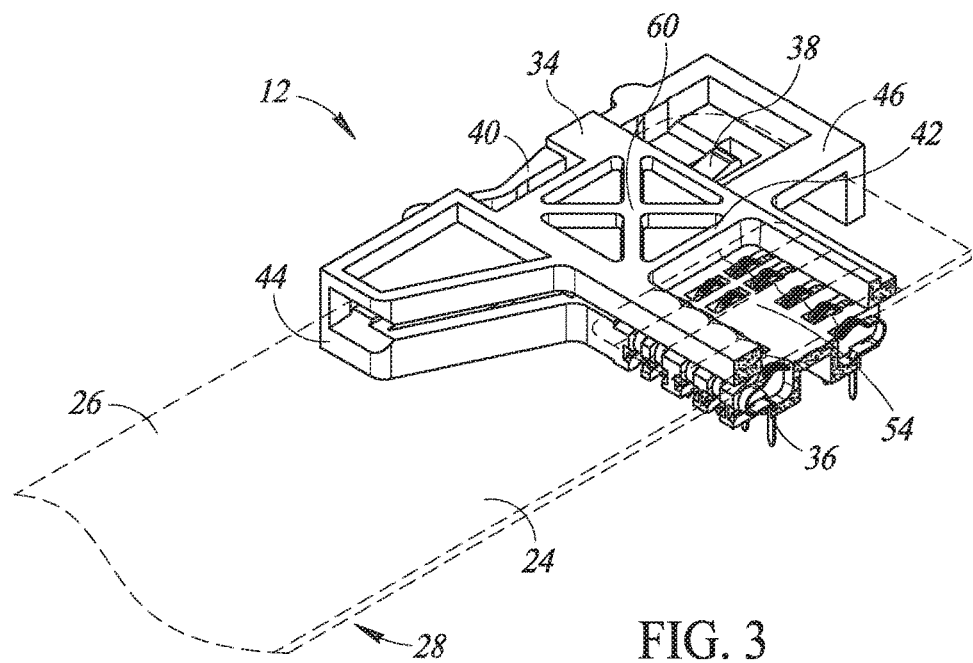
FIG. 3 shows an isometric cross-sectional view of a card reader with an integrated circuit card fully inserted into the card reader along the axis shown in FIG. 2, according to one embodiment disclosed herein.
Figure 4:
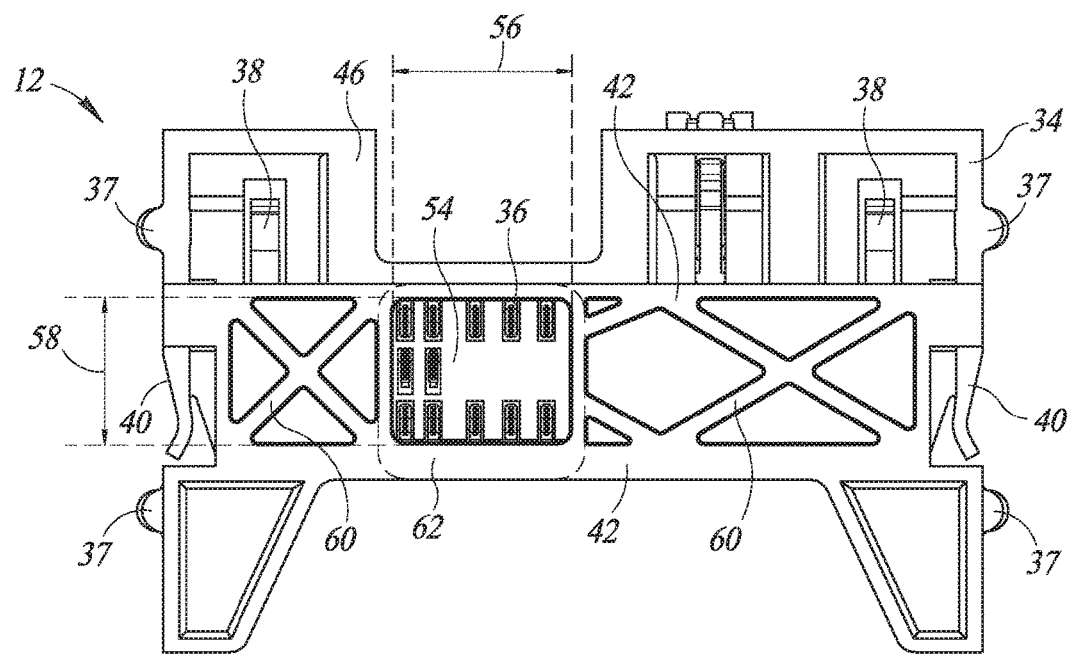
FIG. 4 shows a top view of a card reader, according to one embodiment disclosed herein.
Figure 5:
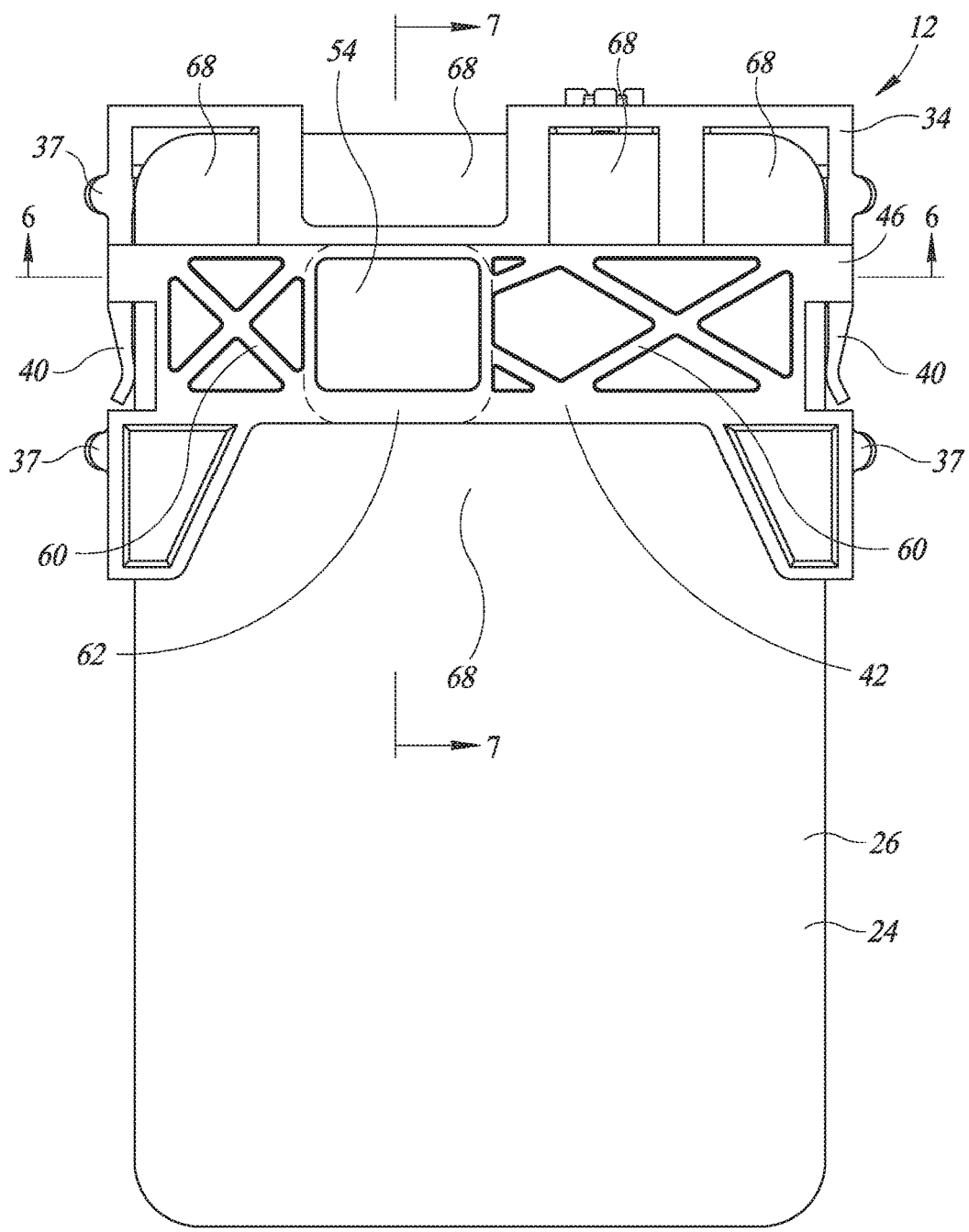
FIG. 5 shows a top view of a card reader with an integrated circuit card fully inserted into the card reader, according to one embodiment disclosed herein.
Figure 6:
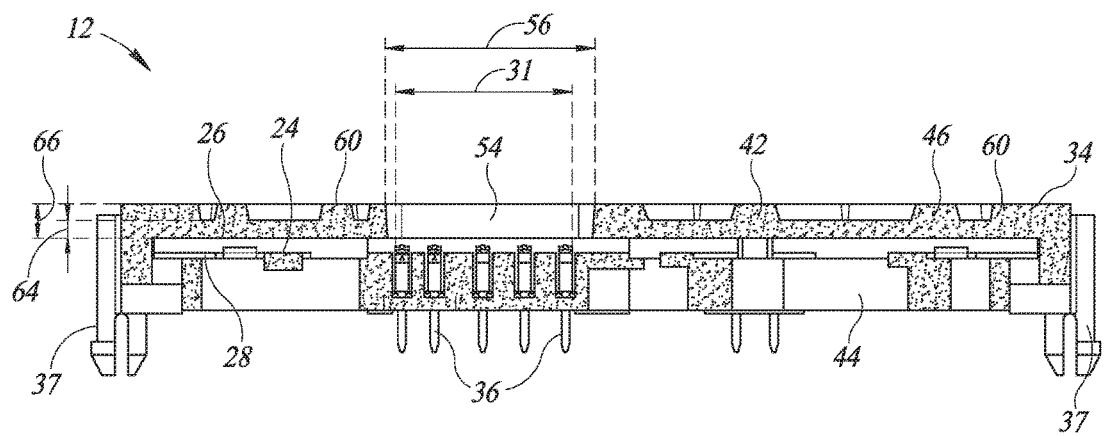
FIG. 6 shows a cross-sectional view of a card reader with an integrated circuit card fully inserted into the card reader along the axis shown in FIG. 5, according to one embodiment disclosed herein.
Figure 7:
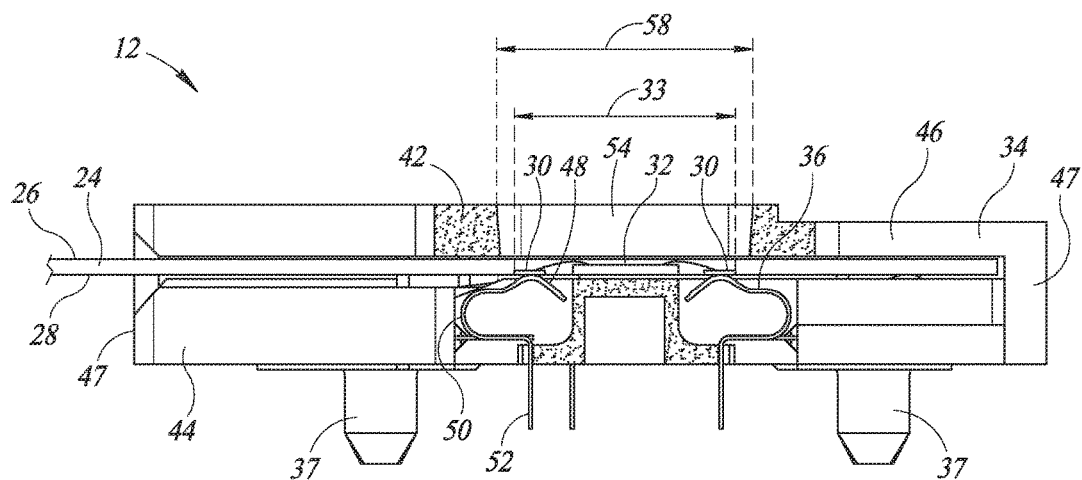
FIG. 7 shows a cross-sectional view of a card reader with an integrated circuit card fully inserted into the card reader along the axis shown in FIG. 5, according to one embodiment disclosed herein.

It is beneficial to review FIG. 2 simultaneously with FIGS. 3 to 7. FIG. 3 is an isometric cross-sectional view of the card reader 12 with the ICC 24 fully inserted into the card reader 12 along the axis shown in FIG. 2. FIG. 4 is a top view of the card reader 12. FIG. 5 is a top view of the card reader 12 with ICC 24 fully inserted into the card reader 12. FIG. 6 is a cross-sectional view of the card reader 12 with the ICC 24 fully inserted into the card reader along the axis shown in FIG. 5. FIG. 7 is a cross-sectional view of the card reader 12 with the ICC 24 fully inserted into the card reader 12 along the axis shown in FIG. 5.

The ICC 24 includes the first side 26 and the second side 28. Contact pads 30 are positioned on the surface of the second side 28. As best shown in FIG. 7, the contact pads 30 are electrically coupled to an embedded integrated circuit 32 housed within the ICC 24. As shown in FIGS. 2, 6 and 7, the contact pads 30 have a length 31 and a width 33 that is substantially perpendicular to the length 31. In one embodiment, the length 31 is between 11 and 13 millimeters, and the width 33 is between 11 and 13 millimeters. In one embodiment, the contact pads 30 have a footprint having an area between 145 and 165 square millimeters. The embedded integrated circuit 32 may be configured to provide a variety of functions, including data encryption and decryption, data storage, authentication, and identification.

The card reader 12 includes a body 34, card contacts 36, engagement members 37, lower retention clips 38, side retention clips 40, and a press bar 42.

The body 34 includes a lower portion 44 (i.e., support or base), an upper portion 46, and side portions 47. The side portions 47 couple the lower portion 44 and the upper portion 46 to each other, and space the lower portion 44 from the upper portion 46. The lower portion 44, the upper portion 46, and the side portions 47 form a slot 49 that is configure to receive the ICC 24.

In one embodiment, the body 34 is a single, contiguous piece made of one or more non-conductive materials, such as ABS plastic or high temperature LCP. The body 34 may be formed using techniques now known or later developed. In one embodiment, the body 34 is formed using injection molding.

When the ICC 24 is fully inserted into the card reader 12, the card contacts 36 physically contact the contact pads 30 and create electrical connections between the integrated circuit 32 within the ICC 24 and the set-top box 14 in which a card reader 12 resides. The card contacts 36 apply an upward physical force (i.e., in a direction away from the lower portion 44 and towards the upper portion 46) on the second side 28 of the ICC 24. As best shown in FIGS. 3 and 7, each of the card contacts 36 includes a card contact portion 48, a mounting portion 50, and a circuit board contact portion 52. The card contact portion 48 is configured to physically contact a respective contact pad of the contact pads 30 when the ICC 24 is fully inserted into the card reader 12. The mounting portion 50 is secured to the body 34, specifically the lower portion 44. The lower portion 44 simultaneously holds each of the card contacts 36 by their respective mounting portions 50 in fixed positions such that the card contacts 36 physically contact the contact pads 30 of the ICC 24 when fully inserted. The circuit board contact portion 52 is configured to physically contact a contact pad of a circuit board in the set-top box 14.

The card contacts 36 are positioned in a plurality of rows. In one embodiment, as best shown in FIG. 4, the card contacts 36 are positioned in a first row having five card contacts, a second row having five card contacts, and a third row having two card contacts positioned between the first row and the second row.

The card contacts 36 are made of one or more conductive materials. The card contacts 36 may include copper, tungsten, aluminum, silver, gold, titanium, tantalum, platinum, or combinations thereof. The card contacts 36 may be fabricated using techniques now known or later developed. In one embodiment, the card contacts 36 are formed by etching and plating conductive material. In another embodiment, the card contacts 36 are formed by stamping a flat sheet of conductive material using a forming press.

It should be noted that although the ICC 24 is shown as a smart card, the card reader 12 may be adapted to be used in conjunction with any type of ICC, such as a subscriber identification module (SIM) card.

The engagement members 37 are coupled to the side portions 47 and extend from the lower portion 44 of the body 34. In one embodiment, as best shown in FIG. 4, there are two engagement members coupled to each of the side portions 47. The engagement members 37 are used to mount the card reader 12 to a circuit board in the set-top box 14. In particular, each of the engagement members 37 is configured to mate with a hole or receptacle of a circuit board.

The lower retention clips 38 and side retention clips 40 hold the ICC 24 in a fixed position when fully inserted into the card reader 12. The lower retention clips 38 are coupled to the lower portion 44 of the body 34. The lower retention clips 38 apply an upward physical force (i.e., in a direction away from the lower portion 44 and towards the upper portion 46) on the second side 28 of the ICC 24 when fully inserted into the card reader 12. Each of the side retention clips 40 are coupled to a respective side portion of the side portions 47 of the body 34. The side retention clips 40 apply a lateral physical force (in a direction towards the card contacts 36) on the sides of the ICC 24 when fully inserted into the card reader 12.

The press bar 42 prevents the ICC 24 from flexing away from the card contacts 36 and ensures that reliable electrical connection is made between the contact pads 30 and the card contacts 36 when the ICC 24 is fully inserted into the card reader 12. The press bar 42 is coupled to the upper portion 46 of the body 34 and directly overlies the card contacts 36. The press bar 42 is spaced from the lower portion 44 by the side portions 47 of the body 34. Referring to FIG. 5, the press bar 42 extends across an entire width 53 of the ICC 24.

The press bar 42 physically contacts the first side 26 of the ICC 24 and provides a positive stop for the ICC 24. In particular, the press bar 42 applies a downward physical force (i.e., in a direction away from the upper portion 46 and towards the lower portion 44) on the first side 26 of the ICC 24 that is equal and opposite to the upward physical force provided by the card contacts 36 and the lower retention clips 38.

As previously discussed, conventional card readers typically include a cover that is a solid piece of plastic that contacts an upper surface of an ICC. A portion of the solid piece of plastic that directly overlies the card contacts of the card reader is typically continuous (i.e., does not include any apertures). Unfortunately, the solid piece of plastic creates a significant extra layer of thermal insulation for the ICC, and heat generated by the ICC, specifically the integrated circuit house within the ICC, is unable to dissipate to ambient conditions.

In contrast to conventional card readers, the inventive press bar 42 includes an aperture 54 to allow the ICC 24, specifically the integrated circuit 32, to dissipate heat more effectively. The aperture 54 is venting area in the press bar 42, which provides a path for heat generated by the integrated circuit 32 to dissipate through the aperture 54 to a surrounding cooling medium, such as air. As most or all of the heat generated by the ICC 24 is generated by the integrated circuit 32, the aperture 54 directly overlies the card contact portions 48 of the card contacts 36. When the ICC 24 is fully inserted into the card reader 12, the aperture 54 overlies the integrated circuit 32. Further, the aperture 54 exposes an area of the surface of the first side 26 of the ICC 24 that is directly opposite to the contact pads 30 on the surface of the second side 28 of the ICC 24. In one embodiment, the exposed area of the surface of the first side 26 is approximately equal to or larger than the area of the footprint of the contact pads 30.

The aperture 54 may have a plurality of different sizes. However, the size of the aperture 54 should be carefully selected to ensure that the press bar 42 is strong enough to prevent the ICC 24 from flexing away from the card contacts 36 such that a reliable electrical connection is made between the contact pads 30 and the card contacts 36 when the ICC 24 is fully inserted into the card reader 12. At the same time, the size of the aperture 54 should be selected to properly dissipate heat from the integrated circuit 32 of the ICC 24.

As shown in FIGS. 4, 6, and 7, the aperture 54 has length 56 and a width 58 that is substantially perpendicular to the length 56. In one embodiment, the length 56 and the width 58 of the aperture 54 is approximately equal to or greater than the length 31 and the width 33, respectively, of the contact pads 30. In one embodiment, the length 56 is between 13 and 15 millimeters, and the width 58 is between 13 and 15 millimeters. In one embodiment, the aperture has an area between 170 and 225 square millimeters. In a preferred embodiment, the aperture 54 has a footprint having an area that is approximately equal to or greater than the area of the footprint of the integrated circuit 32 housed within the ICC 24. In another embodiment, the aperture 54 has a foot print having an area that is approximately equal to or greater than the area of the footprint of the contact pads 30.

To compensate for a loss of strength of the press bar 42 due to the aperture 54, the press bar 42 includes reinforcement ribs 60 and a reinforcement ring 62. The reinforcement ribs 60 provide additional strength for the entire press bar 42 to minimize flexing of the ICC 24 away from the card contacts 36 when fully inserted into the card reader 12. The reinforcement ribs 60 may have any type of pattern. In one embodiment, as best shown in FIG. 5, the reinforcement ribs 60 are arranged in a cross-shaped pattern. In another embodiment, the reinforcement ribs 60 extend horizontally along the width 53 of the ICC 24. In another embodiment, the reinforcement ribs 60 extend vertically (i.e., perpendicular to the width 53 of the ICC 24). The reinforcement ring 62 provides additional strength around the aperture 54. In one embodiment, as best shown in FIGS. 4 and 5, the reinforcement ring 62 completely encircles the aperture 54. Thus, the reinforcement ring 62 completely encircles the area of the surface of the first side 26 of the ICC 24 that is directly opposite to the contact pads 30 on the surface of the second side 28 of the ICC 24 when the ICC 24 is fully inserted into the card reader 12.

The reinforcement ribs 60 and the reinforcement ring 62 strengthen the press bar 42 by adding additional thickness to the press bar 42. Referring to FIG. 6, portions of the press bar 42 not including the reinforcement ribs 60 and the reinforcement ring 62 have a first thickness 64, and portions of the press bar 42 including the reinforcement ribs 60 and the reinforcement ring 62 have a second thickness 66 that is greater than the first thickness 64. In one embodiment, the first thickness 64 is between 1 to 1.2 millimeters. In one embodiment, the second thickness 66 is between 2 to 2.2 millimeters. In one embodiment, as shown in FIG. 6, the reinforcement ribs 60 and the reinforcement ring 62 have the same thickness. In another embodiment, the reinforcement ring 62 has a thickness that is greater than the thickness of the reinforcement ribs 60.

In one embodiment, the card reader 12 includes openings in addition to the aperture 54 to provide additional paths for heat generated by the ICC 24 to dissipate to a surrounding cooling medium, such as air. For example, as best shown in FIG. 5, the card reader may include openings 68. The additional openings are useful in embodiments where the ICC 24 includes active components that generate heat, in addition to the integrated circuit 32, that are located at various locations within the ICC 24 (e.g., directly underlying the openings 68). In one embodiment, the aperture 54 and the openings 68 cover less than 25 percent of the surface area of the first side 26 of the ICC 24 when fully inserted into the card reader 12.

Figure 8:
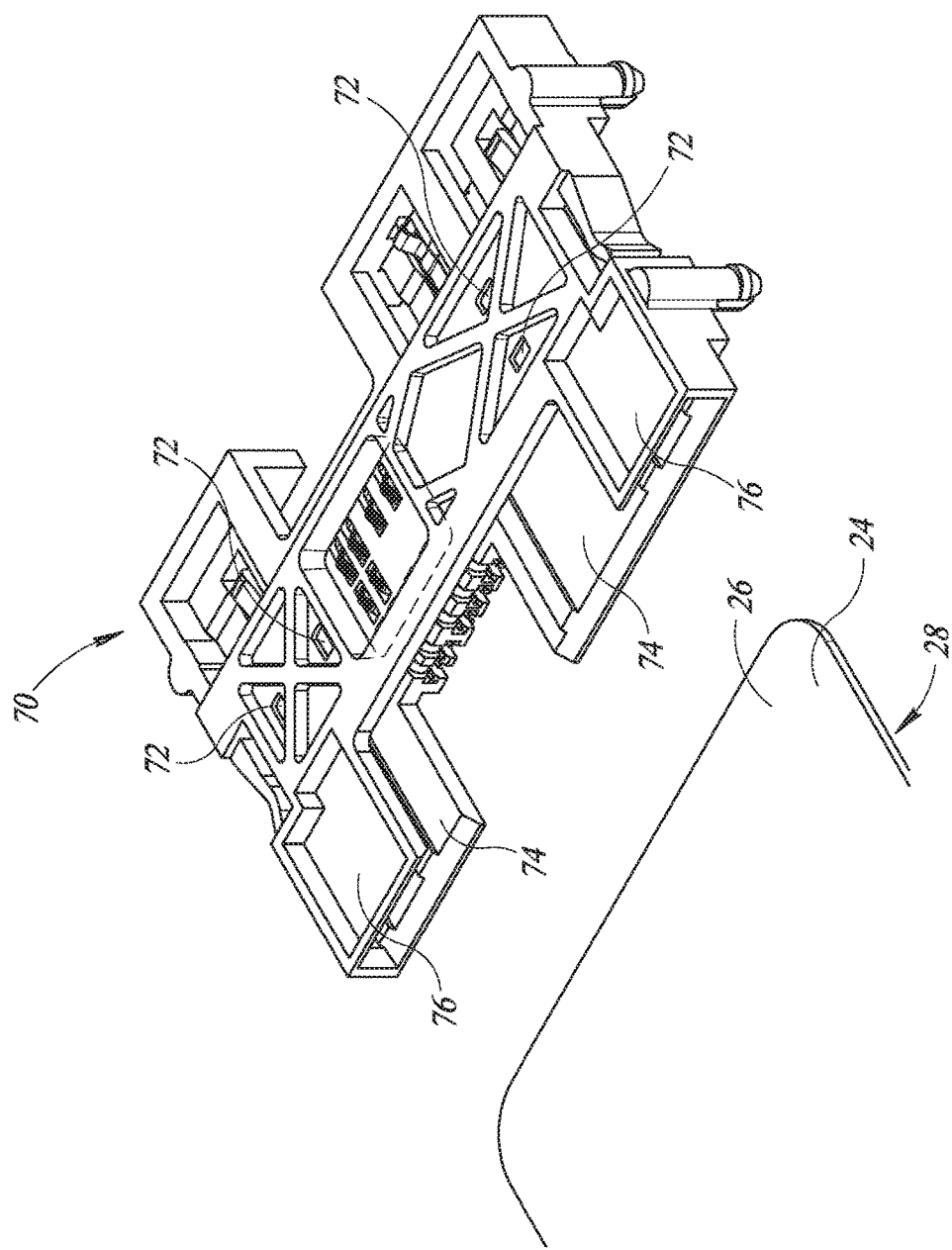
FIG. 8 shows an isometric view of a carder reader, according to another embodiment disclosed herein.

FIG. 8 is an isometric view of a card reader 70 according to another embodiment. The card reader 70 is substantially similar to the card reader 12, except that the card reader 70 includes additional openings 72 in the press bar, and the lower portion and the upper portion of the body includes extended portions 74 and 76, respectively.

Similar to the aperture 54, the openings 72 are venting areas that provide paths for heat generated by the ICC 24 to dissipate through openings 72 to a surrounding cooling medium, such as air. The openings 72 are positioned in the press bar and between the reinforcement ribs.

The extended portions 74 and 76 provide additional contact between the card reader 70 and the ICC 24 to further minimize flexing of the ICC 24 when fully inserted. In particular, the extended portions 74 contact the surface of the second side 28 of the ICC 24, and the extended portions 76 contact the surface of the first side 26 of the ICC 24. Similar to the press bar, the extended portions 76 ensure that a proper electrical connection is made between contact pads 30 of the ICC 24 and card contacts of the card reader 70.

In accordance with one or more embodiments, the card reader disclosed herein provides improved heat dissipation for ICCs. The card reader includes a body having a press bar that physically contacts an upper surface of the ICC when fully inserted into the card reader. The press bar ensures that a proper electrical connection is made between contact pads of the ICC and card contacts of the card reader. The press bar includes an aperture directly overlying and aligned with the card contacts of the card reader and the contacts pads of the ICC when fully inserted. The aperture provides a venting area and allows any heat generated by the ICC to radiate to a surrounding cooling medium, such as air. Accordingly, overheating and damage to the ICC may be avoided. The size of the aperture is selected to properly balance between the amount of contact between the press bar and the ICC, and the size of the aperture needed to properly dissipate heat from the integrated circuit of the ICC. In one embodiment, the aperture has length and width that are approximately equal to or greater than the length and width, respectively, of the contact pads of the ICC. In one embodiment, the footprint of the aperture has an area that is approximately equal to or greater than the area of the footprint of the contact pads of the ICC.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
  a card, including:
    a first surface;
    a second surface opposite the first surface;
    an integrated circuit; and
    contact pads on the second surface, the contact pads being electrically coupled to the integrated circuit, the contact pads extending for a first length along a width of the card and extending for a first width along a length of the card, the contact pads having a footprint of a first area; and a card reader, including:
 a body, including:
  a base; and
  a press bar coupled to the base and physically contacting the first surface of the card;
  an aperture in the press bar, the aperture being a venting area having a second length approximately equal to or greater than the first length and a second width approximately equal to or greater than the first width, the aperture having a footprint of a second area that is approximately equal to or greater than the first area, the aperture exposing a third area of the first surface that is approximately equal to or greater than the first area, the third area being opposite to the contact pads on the second surface and aligned with the first area; and
 card contacts coupled to and extending from the base, the card contacts contacting the contact pads.

2. The system of claim 1 wherein the press bar includes a reinforcement portion that encircles the aperture.

3. The system of claim 2 wherein the press bar has a first thickness and the reinforcement portion has a second thickness that is greater than the first thickness.

4. The system of claim 1 wherein the base and the press bar are a single, contiguous piece.

5. The system of claim 1 wherein the body further includes a plurality of openings exposing the first surface of the card, the press bar being positioned between at least two openings of the plurality of openings.

6. The system of claim 1 wherein the second area is between 170 to 225 square millimeters.

7. The system of claim 1 wherein the second length is greater than the second width.

8. The system of claim 1 wherein the card contacts are arranged in a first row of card contacts, a second row of card contacts, and a third row of card contacts positioned between the first and second rows of card contacts, the first row of card contacts including five card contacts, the second row of card contacts including five card contacts, and the third row of card contacts including two card contacts.

9. A card reader, comprising:
 a plurality of card contacts; and
 a body including:
  a support member, the plurality of card contacts coupled to and extending from the support member; and
  a press bar overlying and coupled to the support member, the press bar including an aperture overlying and aligned with the plurality of card contacts, a first portion of the press bar having a first thickness, a second portion of the press bar having a second thickness that is less than the first thickness, the first portion of the press bar encircling the aperture.

10. The card reader of claim 9 wherein the body is made of a single material.

11. The card reader of claim 9 wherein the plurality of card contacts are configured to physically contact a first surface of a card when the card is fully inserted into the card reader, and the press bar is configured to physically contact a second surface, opposite to the first surface, of the card when the card is fully inserted into the card reader.

12. The card reader of claim 11 wherein the aperture exposes an area of the second surface that is opposite to an area of the first surface where the plurality of card contacts physically contact the first surface of the card when the card is fully inserted in to the card reader.

13. A card reader, comprising:
 a base;
 a plurality of card contacts coupled to and extending from the base, portions of the plurality of card contacts being configured to contact a first surface of a card inserted into the card reader; and
 a press bar coupled to and overlying the base, the press bar being configured to contact a second surface, opposite to the first surface, of the card inserted into the card reader, the press bar including an aperture directly overlying and aligned with the portions of the plurality of card contacts, the aperture exposing the portions of the plurality of card contacts when the card is not inserted into the card reader.

14. The card reader of claim 13 wherein the base and the press bar are made of plastic.

15. The card reader of claim 13 wherein the plurality of card contacts include at least twelve card contacts.

16. The card reader of claim 13 wherein portions of the press bar that encircles the aperture are reinforced.

* * * * *